United States Patent

Schwartzman

[15] 3,653,779

[45] Apr. 4, 1972

[54] DISC VALVE FOR APPLICATOR

[72] Inventor: Gilbert Schwartzman, 20 Wilmot Circle, Scarsdale, N.Y. 10583

[22] Filed: Mar. 30, 1970

[21] Appl. No.: 23,910

[52] U.S. Cl. ............................................................. 401/206
[51] Int. Cl. ........................................................... B43m 11/06
[58] Field of Search ........................................ 401/206, 273

[56] References Cited

UNITED STATES PATENTS

| 893,635 | 7/1908 | Marquart | 401/273 |
| 1,620,801 | 3/1927 | Clark | 401/206 X |
| 3,203,026 | 8/1965 | Schwartzman | 401/206 |
| 3,356,441 | 12/1967 | Schwartzman | 401/206 |
| 3,468,611 | 9/1969 | Ward | 401/206 X |

FOREIGN PATENTS OR APPLICATIONS 507,738   9/1930   Germany ................................ 401/206

*Primary Examiner*—Harland S. Skogquist
*Attorney*—Kenneth S. Goldfarb

[57] ABSTRACT

A fluid applicator comprising a retainer ring adapted to be seated in a container and having a peripheral flange which not only serves to hold a cover in place, but also maintains a disc valve assembly in a bowed convex position. The disc valve assembly engages the cover to normally hold the cover in a dome-like shape and has a depending stem which extends through an opening in the retainer ring and a valve head below the retainer ring normally urged into engagement with the retainer ring for controlling fluid flow.

3 Claims, 4 Drawing Figures

PATENTED APR 4 1972 3,653,779

INVENTOR.
GILBERT SCHWARTZMAN
BY
Kenneth S. Goldfarb
ATTORNEY

DISC VALVE FOR APPLICATOR

This invention relates to a fluid applicator especially adapted for use in applying cosmetics, medications, or pigments on the person or clothing of the user.

In the past, various types of valve arrangements for fluid applicators have been devised. In U.S. Pat. No. 3,203,026 to Gilbert Schwartzman, issued Aug. 31, 1965, for "Fluid Applicator," there is disclosed a retainer ring which has a cover attached thereto and which is provided with a valve assembly employing helical coil springs. This valve assembly is highly effective and useful for most fluids except those types of fluids which may have a tendency to cake, gum, or harden.

The concept of this invention features the use of a novel valve assembly of a type wherein the use thereof will break up caked matter, which is simple in construction and capable of effective use in metering fluid and which may be used with the retainer ring of conventional construction.

The construction of this invention features the use of a disc-shaped valve assembly employing a disc which is placed under stress into a concave shape and so arranged so as to bow the disc into an outwardly convex shape which not only serves to draw the valve head against the valve stem, but bows the cover into a dome-like shape for effective application of fluid.

Still further objects and features of this invention reside in the provision of a fluid applicator employing a disc valve assembly that is simple in construction, capable of being assembled in a rapid and convenient manner and which is inexpensive to manufacture thereby permitting wide use and distribution.

These, together with the various ancillary objects and features of this invention, which will become apparent as the following description proceeds, are attained by this applicator provided with a disc valve assembly, preferred embodiments of which are illustrated in the accompanying drawing, by way of example only, wherein.

Figure 1:
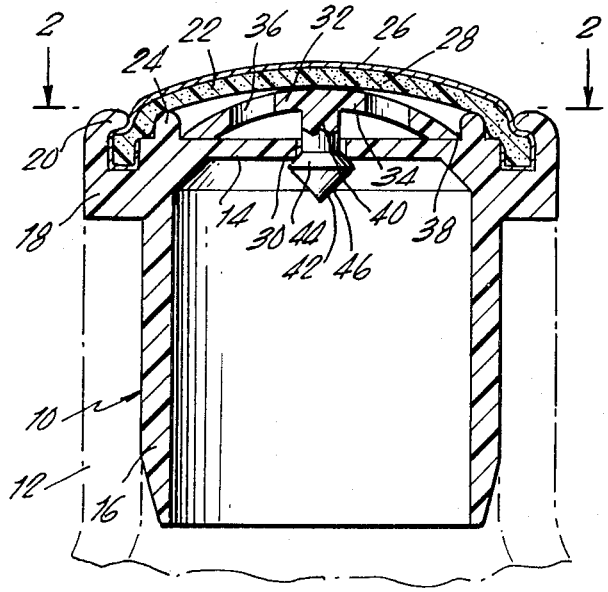
FIG. 1 is a vertical sectional view of an applicator constructed in accordance with the concepts of the present invention.
Figure 2:
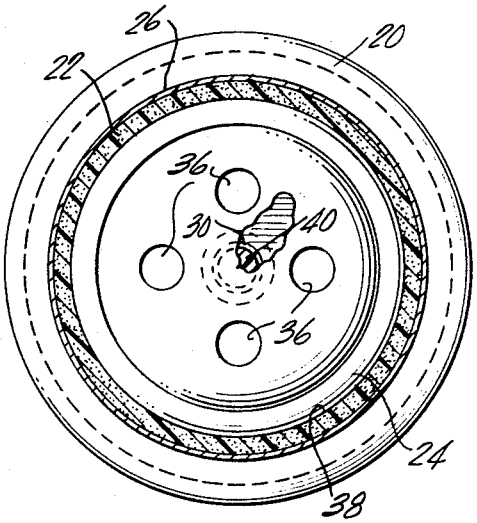
FIG. 2 is a horizontal sectional view taken along the plane of line 2—2 in FIG. 1, with a part of the valve assembly being broken away to show other parts in detail.
Figure 3:
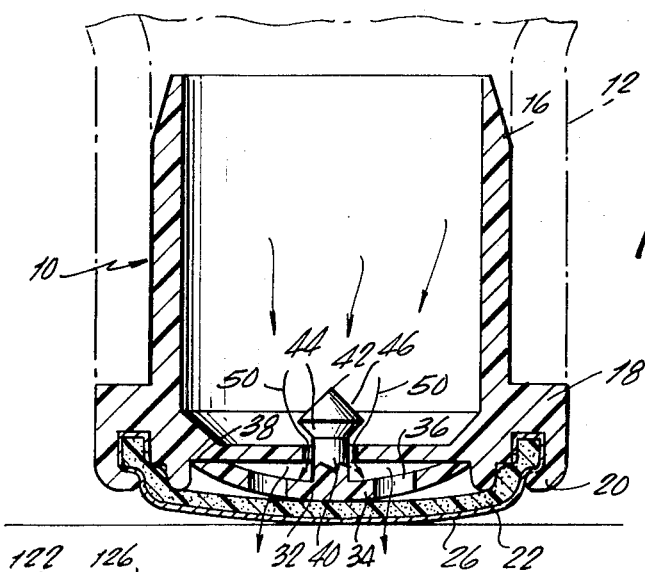
FIG. 3 is a view similar to FIG. 1, but showing the applicator in use.

With continuing reference to the accompanying drawing, wherein like reference numerals designate similar parts throughout the various views, reference numeral 10 is used to generally designate a fluid applicator constructed in accordance with the concepts of the present invention, which is adapted to be inserted into the neck of any type of suitable container 12. The applicator 10 includes a retainer ring 14 having a projecting portion 16 which is designed to fit in the neck of the container and includes a flange 18 integral with the ring 14 and provided with a swaged lip 20 for retaining a cover 22 between the flange 18 and a circular flange 24. The cover 22 is constructed in two layers, the upper layer 26 being formed of a nylon knitted brushed fabric. Laminated and bonded to the nylon knitted brushed fabric layer 26 is a lower layer 28 of polyurethane foam.

The flange 24 surrounds an opening 30 formed in the ring 14. A disc valve assembly 32 is provided for controlling fluid flow through the opening 30 and includes a disc 34 provided with a plurality of annularly spaced bores 36 therethrough. The disc has a larger diameter than the inner diameter of the flange 24 so that when the peripheral edge 38 of the disc engages the flange, while the disc is also in engagement with the ring 14, it is under stress and is bowed outwardly in a convex manner as shown in FIG. 1.

Integral with and depending from the disc 34 is a valve stem 40 adapted to extend through the opening 30. Integral with the valve stem is a valve head 42 having a lower downwardly diverging truncated conical portion 44 and a lower conical portion 46. The valve head may be snapped into place through the opening 30 or may be formed by a heated tool after the valve stem has been pushed through the opening 30 as may be desired.

In use, the container 12 is overturned and upon pressing the applicator downwardly on the surface to be covered, the cover 22 will push against the valve assembly 32 so as to permit fluid flow in the direction of arrows 50 through the opening 30 and thence through bores 36 through the cover 22 onto the surface to be coated. Release of the cover from the surface will immediately cause the disc valve to snap the valve head portion 40 against the retainer ring 14 closing the opening and preventing further fluid flow out of the container 12.

Figure 4:
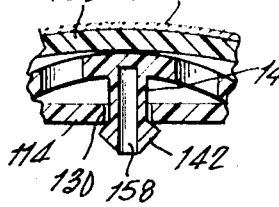
FIG. 4 is a partial sectional view showing a modified form of the valve assembly.

In FIG. 4 there is shown a modified form of the invention utilized for reducing the amount of matter used in construction of the valve assembly 32, while also facilitating the insertion of the valve head through the retainer ring. Herein the retainer ring 114 is provided with an opening 130 therethrough and the valve stem 140 as well as the valve head 142 are provided with a recess 158 therethrough. Because of the recess, the valve head 142 may be more easily force fitted through the retainer ring 114.

A latitude of modification, substitution and change is intended in the foregoing disclosure and in some instances, some features of the invention will be employed without a corresponding use of other features.

I claim:

1. A fluid applicator comprising a retainer ring having a projecting portion, a cover secured to said ring, said ring having a opening therethrough, a circular flange surrounding said opening and extending toward said cover, a valve assembly including a disc disposed between said cover and said ring, said disc having a plurality of spaced bores therein, the diameter of said disc when in an unstressed condition being normally greater than the inside diameter of said flange, the peripheral edge of said disc engaging said flange with said disc engaging said ring and being stressed into an upwardly convex position having a convex face engaging said cover to bow said cover upwardly, said disc having at least one bore therethrough, a valve stem depending from and integral with said disc and extending through said opening, and a valve head on said stem and integral therewith, said valve head being below said ring and being engageable with said ring to close said opening for limiting fluid flow.

2. A fluid applicator according to claim 1, wherein said valve head includes a truncated conical portion flaring outwardly and downwardly, and a lower downwardly converging conical portion.

3. A fluid applicator according to claim 2, wherein said head and said stem have a recess therein.

* * * * *